United States Patent
Nachev

(10) Patent No.: US 9,633,108 B2
(45) Date of Patent: Apr. 25, 2017

(54) METHOD AND SYSTEM FOR ANOMALY DETECTION IN DATA SETS

(75) Inventor: Parashkev Nachev, London (GB)

(73) Assignee: UCL BUSINESS PLC, London (GB)

(*) Notice: Subject to any disclaimer, the term of this patent is extended or adjusted under 35 U.S.C. 154(b) by 627 days.

(21) Appl. No.: 13/812,333

(22) PCT Filed: Jul. 21, 2011

(86) PCT No.: PCT/GB2011/001094
§ 371 (c)(1),
(2), (4) Date: Jul. 29, 2013

(87) PCT Pub. No.: WO2012/013920
PCT Pub. Date: Feb. 2, 2012

(65) Prior Publication Data
US 2013/0304710 A1    Nov. 14, 2013

(30) Foreign Application Priority Data

Jul. 26, 2010 (GB) .................................. 1012519.3

(51) Int. Cl.
| | |
|---|---|
| *G06F 17/30* | (2006.01) |
| *G06K 9/62* | (2006.01) |
| *G06T 7/00* | (2017.01) |

(52) U.S. Cl.
CPC ....... *G06F 17/3061* (2013.01); *G06K 9/6284* (2013.01); *G06T 7/0012* (2013.01);
(Continued)

(58) Field of Classification Search
CPC .......................... G06T 7/0012; G06K 9/6284
(Continued)

(56) References Cited

U.S. PATENT DOCUMENTS

| | | | |
|---|---|---|---|
| 6,829,389 B1 * | 12/2004 | Arakawa et al. | 382/218 |
| 2005/0036668 A1 * | 2/2005 | McLennan et al. | 382/128 |

(Continued)

FOREIGN PATENT DOCUMENTS

| | | |
|---|---|---|
| JP | 2004-135868 A | 5/2004 |
| JP | 2009-523270 A | 6/2009 |

OTHER PUBLICATIONS

Search Report for related application No. GB1012519.3 mailed Nov. 18, 2010.

(Continued)

*Primary Examiner* — Syling Yen
(74) *Attorney, Agent, or Firm* — Banner & Witcoff, Ltd.

(57) ABSTRACT

A method and apparatus for detecting and segmenting anomalous data in an input data set such as an image is described, which makes use of a normalized distance measure referred to as a zeta distance score. A test data point from an input test data set is compared with its corresponding nearest neighboring standard data points in standard data sets representing variation in normal or expected data values, and the average distance from the test data point to the standard data points is found. An additional average distance measure representing the average distance between the different nearest neighboring corresponding standard data points is also found, and a normalized distance measure obtained by finding the difference between the average distance from the test data point to the standard points and the average distance between the nearest neighboring standard data points themselves. Where the input test data set is an image then a zeta distance score map can be found. By then thresholding the zeta distance scores obtained for the input data set using an appropriate threshold, anomalous data in the data set with a high zeta distance score can be identified, and segmented.

17 Claims, 10 Drawing Sheets

(52) U.S. Cl.
CPC ............... *G06T 2207/20101* (2013.01); *G06T 2207/30004* (2013.01)

(58) Field of Classification Search
USPC ................. 707/688–690, 692–694, 999.201; 382/128, 168, 162, 132, 217, 131
See application file for complete search history.

(56) References Cited

U.S. PATENT DOCUMENTS

| | | | |
|---|---|---|---|
| 2006/0161592 A1* | 7/2006 | Ertoz et al. ................... | 707/200 |
| 2007/0217668 A1* | 9/2007 | Bornemann et al. ......... | 382/132 |
| 2009/0091443 A1* | 4/2009 | Chen et al. ................... | 340/540 |

OTHER PUBLICATIONS

May 26, 2015—(JP) Notification of Reasons for Rejection—App 2013-521204.

\* cited by examiner

METHOD AND SYSTEM FOR ANOMALY DETECTION IN DATA SETS

TECHNICAL FIELD

The present invention relates to a method and system for detecting anomalies in a set of data, and particularly image data. In some embodiments of the invention the image data is high-dimensional data such as moving or volumetric image data, and in some embodiments anomaly detection is used to provide for automatic detection and segmentation of pathological lesions in medical imagery of the brain.

BACKGROUND TO THE INVENTION

It is often desirable to be able to detect instances within a set of data that may be said to differ from the rest sufficiently to constitute outliers or anomalies. For example, within the medical domain, one might wish to identify alarming changes in physiological parameters such as heart rate in patients undergoing continuous monitoring, or abnormalities in the appearance of the brain on magnetic resonance or computed tomography scans. Examples in other domains include being able to identify anomalous movements in time-varying data such as stock markets, or isolating defective items going through a production line based on their video snapshots. Where the data has only one dimension (e.g. each instance of data has a single scalar value) and the distribution of values is simple (e.g. a normal distribution) a criterion of anomaly is easy to derive. However, where the data is high dimensional (e.g. moving or static images, time series, volume data, etc) and/or the distribution of values is complex (e.g. multimodal) a satisfactory criterion of anomaly is very hard to find.

One promising approach is to take a "standard" dataset known a priori to be free of anomaly and then to define what is normal or anomalous by indexing the relation of the test datum to those instances of data in the standard dataset that are the most similar to it, what might be called its neighbours. By varying the number of neighbours, k, one uses for this comparison, one can manipulate the scale of deviation from the usual or expected by which anomaly is defined.

Thus, one simple measure of the anomaly of a given data point, x, is the average distance to its k-nearest neighbours, a measure known as gamma ($\gamma$) (Harmeling, Dornhege, Tax, Meinecke, & Müller, 2006):

$$\gamma_k(x) = \frac{1}{k}\sum_{i=1}^{k} d(x, nn_i(x))$$

Unfortunately, $\gamma$ unhelpfully varies with the natural density of the points—dense regions will have low values and sparse regions high ones—making the labelling of anomalies density dependent (Harmeling et al., 2006). This is illustrated in FIG. 1, where a heterogeneous synthetic two-dimensional dataset is labelled by the $\gamma$ score of each point: the larger the diameter of a point the higher the $\gamma$ score. It is easy to see that members of the smaller, denser cluster will generally have a smaller value of $\gamma$ than members of the larger, sparser cluster even though they belong equally strongly to their respective clusters. Thus, if anomaly were to be determined by a fixed threshold of $\gamma$, either too many members of the sparse cluster will be labelled as anomalous or too few of the denser one: it is easy to see that the score is confounded by local differences in density.

SUMMARY OF THE INVENTION

A method and apparatus for detecting and segmenting anomalous data in an input data set such as an image is described, which makes use of a normalised distance measure referred to as a zeta distance score. Within embodiments of the invention it is assumed that data is organised into sets of cases, each case being a test instance composed of one or more data points. For example, where each case is a single measurement, such as the momentary temperature of an object, each case is composed of a single data point. Conversely, where each case is composed of multiple measurements, such as the individual pixel intensities making up an image, each case has multiple data points. Here we take a test case individually and compare it with a plurality of different cases from a "standard" or "reference" data set representing normal or expected variation in data values. A data point from an input test case is compared with the corresponding data points in the standard set of cases, and the average "distance" from the test data point to each of those corresponding points within the standard data set that are closest in value to it is found. For example, if the test case is an image, and each data point is the intensity of each pixel, the distance calculated is, for each test pixel, the average difference between the pixel intensity in the test image and the corresponding pixels in those of the standard set of images where the corresponding pixels are closest in value to the test pixel. The points within the standard data set that are closest in value to the test data point are termed that point's nearest neighbours; the number of nearest neighbours, k, included in the calculation is arbitrarily chosen from within the range of zero to the number of cases in the standard data set, depending on the scale of the anomaly one seeks to capture. A normalised distance measure is then obtained by finding the difference between the average distance from the test data point to its nearest neighbours in the standard data set and the average distance between the nearest neighbour data points themselves. This normalised distance is known as the zeta score. Each of the test and standard data points may be described by a single value or dimension (a scalar, e.g. the intensity of a pixel in an image) or a series of values or dimensions (a vector, e.g. the x, y, z values of an anatomical location in a three dimensional brain scan, or three different intensities of a pixel in three different types of images of the same object), but the number of dimensions must be the same for all points being compared. Where the number of dimensions per point is greater than 1 (i.e. where each data point is a vector) the distance measure is not algebraic but Euclidean, or any of a number of distance measures for multidimensional data. The result of the zeta score calculation is a series of scalar values each corresponding to each of the test data points. If the test data points are the individual pixels of a two-dimensional image the result is also a two-dimensional image where each pixel is labelled by its zeta score. If the test data points are the individual voxels of a three dimensional image (i.e. volume) the result is also a three dimensional volume likewise labelled. In short, the dimensionality of the case, as opposed to the dimensionality of each data point, determines the dimensionality of the result of the zeta calculation. The zeta score is a real-numbered measure; if desired it can be thresholded so as to generate a binary map distinguishing data points that are anomalous from those that are not. Alternatively the zeta score for each point can be used as a continuous index of the degree of anomaly.

In view of the above, from a first aspect the present invention provides a method of identifying anomalous data in a test data set, the method comprising: storing one or more standard data sets of a plurality of different standard cases, each standard case containing one or more standard data points representing variation within normal, non-anomalous, data; calculating a first average difference measure between one or more test data points in the test data set and the corresponding standard data points in at least one of the plurality of cases in the standard data set that are closest in value to the test data point (i.e. the test point's neighbours in the standard data set); determining a second average difference measure between the neighbours of each test point across cases in the standard data set in s; calculating a normalised difference measure relating to the one or more test data points in dependence on at least the first and second average difference measures; and identifying a test data point as anomalous in dependence on the value of the calculated normalised difference measure for the test data point.

Within the above the use of the normalised distance measure to identify test data points as anomalous presents numerous advantages. For example, it requires little optimisation for a given test data set, the main optimisation parameters being the number of corresponding standard data points, k, (the nearest neighbours) in respect of which the first and second difference measures are found. In many embodiments this parameter will be the same for both the first and second difference measures. As a consequence the technique adapts optimally to data of any complexity, and it is agnostic about features of anomalous data, relying entirely on features of standard or "normal" data, thereby allowing excellent performance on data to which it is naive. It is also algorithmically and computationally simple and hence easy to implement.

In one embodiment the test data set is a test image or volume of data comprising a plurality of test pixels or voxels as test data points, and each standard data set is a plurality of different standard images comprising corresponding target pixels or voxels as standard data points, and wherein a plurality of normalised difference measures are calculated relating to the plurality of test pixels or voxels, the plurality of normalised difference measures being stored as a normalised difference measure map corresponding to the test image. In this way the method of the present invention is particularly adapted for use on image data, and the normalised difference measures can be displayed as an image corresponding to an input image, for viewing by the user. In this respect, the normalised difference map itself may in some circumstances impart useful information to the user, depending on the particular application for which it is employed.

In one preferred embodiment the image data is medical imagery obtained through at least one of the following: magnetic resonance imaging (MRI), computerised tomography (CT), ultrasound, or X-rays. In particular in one embodiment the test image is an MRI image of a brain potentially containing one or more stroke lesions, and the standard images are corresponding MRI images of normal brains without stroke lesions. In this respect the techniques of the present invention have been found to be particularly useful for the automatic identification and mapping of the extent of stroke lesions in MRI imagery of the brains of stroke patients. Knowledge of the size and extent of a stroke lesion can help a physician in deciding on diagnosis and treatment options.

In some embodiments the identifying of a test data point as anomalous is a threshold based segmentation operation. That is, a test data point is labelled as anomalous based on a comparison of the normalised difference measure generated for a test data point with a threshold value. In one embodiment the threshold is an adaptive threshold determined in dependence on a predetermined rate of change of number of test data points identified as anomalous as the adaptive threshold is changed. This allows for the threshold to be set at an adaptive level using a priori knowledge of an expected number of anomalous data points.

One embodiment further comprises performing a clustering operation to cluster segmented test data points, and removing clustered test data points comprising a number of data points less than a predetermined number from the anomalous segmentation. This allows for data points that have been incorrectly segmented as anomalous, for example due to noise in the input data set to be filtered out, and hence improves overall segmentation performance.

In some embodiments of the invention each data point in the test and standard data sets is described by more than one value, i.e. a vector of length n rather than a scalar. For example, a data point may be described by a vector of three values, each giving (say) the x, y, and z, of three dimensional spatial coordinates. The length of the vector may thus be said to determine the dimensionality of the data points. The distance measure computed between the test data point and the corresponding data points in the standard data set must therefore be not the algebraic difference but some other distance measure such at the Euclidean distance or any other high-dimensional distance measure.

The dimensionality of the data points may be intrinsic to the data (e.g. because it describes a set of spatial locations) or it may be the result of deliberately combining disparate data for the sake of the specific application. For example, each case in a data set might contain n images each employing a different imaging modality sensitive to n different aspects of the object imaged. If we wish to determine the anomaly of the test case taking into account the n imaging modalities together we can combine the values of each pixel so that each data point entered into the zeta calculation is a vector of n values, each giving the pixel intensity in each of the n images. There is no theoretical limit on the number of imaging modalities that can be combined in this way, the distance measure being Euclidean or any other high-dimensional measure as already said. When applied in the imaging domain the resulting anomaly labelling may be termed multispectral labelling or segmentation.

In another embodiment of the invention each data point within the test and standard data sets is taken not in isolation but together with an arbitrarily chosen subset of the others. Thus the distance measures are calculated for subsets of features taken together, where each feature is treated as a dimension. For example, if each case of the data is a digital image and each data point is a pixel, one may take subsets of adjacent pixels (e.g. a 3×3 grid) and enter each subset into the calculation with each of the pixel values describing a dimension of the subset. The zeta value derived from this calculation will thus apply for each subset rather than for each pixel, for each of the composite pixel values is now treated as a dimension of the subset rather than as an isolated test datum. How the case is subdivided to generate such subsets is arbitrary and will depend on the kind of anomaly being sought. In some cases it may be desirable to treat all the data points in each case in this way, i.e. every data point in the case is treated as a dimension of a single test datum. For example, if an image is n×m pixels, and we wish to treat the entire image as a single test datum, the input datum for each test case would be a single vector of length n*m; the distance measure being the Euclidean or some other distance measure in n*m dimensional space. The zeta value generated by such a calculation would be a single value per case, i.e. it will index the anomaly of the case as a whole rather than any specific part of it. In the case of images, it would therefore have utility in determining which image as a whole is anomalous rather than which specific part of an image is anomalous.

More generally, in some embodiments the high dimensional case may arise because the data is itself high dimensional or because data is aggregated together to make it so. An example of the former case is where each data point is a vector such as the x,y,z of a spatial location, an example of the latter is taking n images of the same thing captured with different imaging modalities (i.e. multi-spectral imaging), where each pixel location therefore has n values. One might also choose to aggregate data within a case, i.e. to take "chunks" of features together, each feature being treated as a dimension. Thus, rather than performing the operation pixel wise, it is done in chunks of pixels.

A more specific example in one embodiment of the invention is where each case of a set of test and standard images contains two images, the second being a processed version of the first, and wherein each image has test pixels or voxels as test data points. The first difference measure is an average of a series of two-dimensional distance measures, each dimension being defined by each of the two images comprising each case. For example, in one embodiment the first image of each case may be an MRI image, and the second the same MRI image but subject to a processing function, such as a filtering function or the like. In one specific embodiment described later, the first image of each case is a b0 MRI image of a human brain, and the second a Gaussian smoothed version of the same image, each case containing images of the brains of different subjects or the same subject at different times In some circumstances the correspondence between a test data point and its counterpart in the standard data set is not given but must be determined in advance or otherwise like will not be compared with like. Thus, in one embodiment a correspondence between test data points of the test data set and respective corresponding standard data points in one or more sets of a plurality of standard cases is established before the first and second difference measures can be found. Depending on the nature of the test data set and the standard data sets this may be a necessary step to ensure that meaningful difference measures are being calculated between test and standard data points that represent substantially the same (or preferably identically the same) features—there is little point comparing a test data point representing a first feature with a standard data point representing a different, second, feature. In this respect, for image data as the test data set and standard data sets, establishing the correspondence may include aligning the test image in co-registration with the target images. In this way pixels or voxels in the test and target images representing the same features become aligned, and are compared against each other.

In embodiments of the invention the normalised difference measure is calculated as the difference of the first and second average distance measures. This is referred to herein as a zeta distance score, and it presents numerous advantages as discussed throughout the specification.

In some embodiments of the invention the first average distance measure is the average distance from a test point to $k_1$ nearest neighbouring corresponding target data points, and the second average distance measure is the average distance measure between $k_2$ nearest neighbouring corresponding target data points, wherein $k_1$ and $k_2$ are different. This allows for more parameters to be altered, to allow for improved optimisation.

From another aspect, the present invention also provides an apparatus, comprising: at least one processor; and at least one memory including computer program code; the at least one memory and the computer program code configured to, with the at least one processor, cause the apparatus to perform at least the following: provide one or more sets of a plurality of standard cases, each standard case containing one or more target data points representing normal, non-anomalous, data; calculate a first average difference measure between one or more test data points in the test data set and one or more corresponding data points in at least one of the plurality of standard data cases; determine a second average difference measure between the corresponding standard data points in the at least one of the plurality of standard data cases; calculate a normalised difference measure relating to the one or more test data points in dependence on at least on the first and second average difference measures; and identify a test data point as anomalous in dependence on the value of the calculated normalised difference measure for the test data point.

From another aspect the present invention also provides an apparatus, comprising: means for providing one or more sets of a plurality of standard data cases, each standard data case containing one or more standard data points representing normal, non-anomalous, data; means for calculating a first average difference measure between one or more test data points in the test data set and one or more corresponding target data points in at least two of the plurality of standard data sets; means for determining a second average difference measure between the corresponding standard data points in at least one of the plurality of data cases; means for calculating a normalised difference measure relating to the one or more test data points in dependence on at least on the first and second average difference measures; and means for identifying a test data point as anomalous in dependence on the value of the calculated normalised difference measure for the test data point.

A further aspect of the invention provides a system arranged to identify anomalies, comprising: an input at which is received in use test data to be analysed for anomalies; a data memory within which a plurality of standard data sets representing variation in normal data values can be stored; a data processor arranged to calculate normalised distance measures for the test data representing a difference between the distance between corresponding parts of the test data and the standard data and the distance between the corresponding target data; and a data segmenter arranged to identify anomalous test data by comparison of the normalised distance measures to one or more threshold values.

In another aspect, the invention also provides a method for identifying anomalies in test data, comprising: receiving test data to be analysed for anomalies; providing a plurality of standard data sets representing normal data values; calculating normalised distance measures for the test data representing a difference between the distance between corresponding parts of the test data and the standard data and the distance between the corresponding target data; and segmenting anomalous test data by comparison of the normalised distance measures to one or more threshold values.

A yet further aspect of the invention provides a computer program or suite of computer programs so arranged such that when executed by a computer it/they cause the computer to operate in accordance with the method of any of the above aspects. Additionally provided from a further aspect is a computer readable storage medium storing the computer program or at least one of the suite of computer programs according to the previous aspect.

DESCRIPTION OF THE DRAWINGS

Further features and advantages of the present invention will be apparent from the following description of embodiments thereof, presented by way of example only, and by reference to the accompanying drawings, wherein like reference numerals refer to like parts, and wherein.

DESCRIPTION OF EMBODIMENTS

Overview of Embodiments

Figure 2:
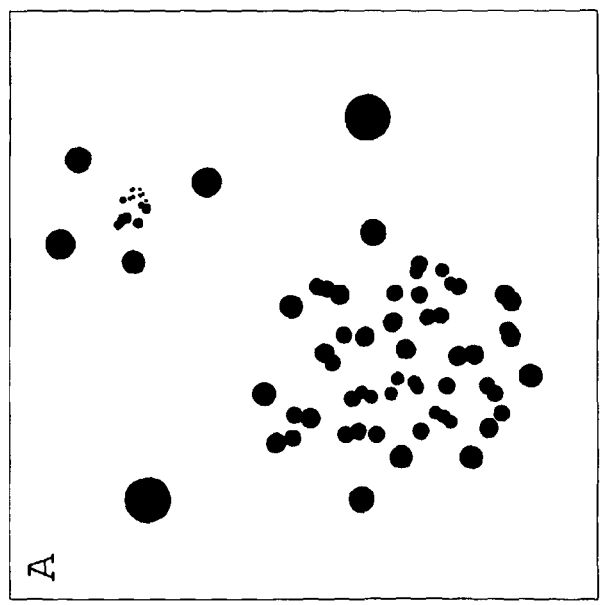
FIG. 2 is an example dataset used to illustrate a zeta normalised distance measure, as used in an embodiment of the invention.

Embodiments of the invention relate to a data processing technique which makes use of a normalised measure of distance between data sets referred to herein as a zeta distance score. In particular, embodiments of the invention relate to being able to automatically detect anomalous data within a test data set by comparing it against one or more standard data sets representing "normal" data i.e. data have values within an expected normal range. One measure of anomaly is the average distance or difference between a test data point and a plurality of corresponding standard data points that are most similar to it, i.e. its nearest neighbours, often referred to as gamma ($\gamma$). However, as explained in detail later, use of gamma has a number of drawbacks, and is particularly susceptible to the density or range of values over which a particular set of data points extends, in that for a set which spreads over a wider range, too many of the data points in the set may be regarded as anomalous.

In order to overcome this problem embodiments of the invention make use of a normalised average distance measure referred to herein as zeta ($\xi$). As explained further below, the zeta distance score is the difference between the average distance from a test data point to a set of standard data points that are most like it (i.e. its nearest neighbours) and the average distance between the nearest neighbouring data points in the standard dataset themselves. By taking this difference the effects of sparse or dense clusters of standard data points is normalised out, and hence it becomes easier to spot anomalous data points to the set of standard data points using thresholding operations on the resulting zeta distance scores.

Embodiments of the invention make use of the zeta distance score in providing for automated segmentation of anomalous data in particular within images. Even more particularly, the image data is medical imagery, for example MRI (magnetic resonance imaging), CT (computerised tomography), ultrasound, or X-ray images. In one preferred embodiment the image data is MRI imagery of the brain, and an automated segmentation algorithm is provided to try and identify and map the extent of pathological lesions in the brain.

In particular, as will be explained in more detail later, in one or more embodiments of the invention a set of standard data sets representing "normal" data is stored, for example a plurality of images representing normal data. In one embodiment the set of standard data sets may be MRI images of healthy brains of the brains of patients found not to show any focal abnormality A test data set is then input, for example a test image, which in one embodiment may be an MRI image of the brain of a test subject. The data in the test data set is then compared, data-point by data-point with the corresponding target data points in the target data sets, and a zeta distance score calculated for each data-point. Where the test data is image data, then a zeta distance score is calculated for each pixel (or voxel, if each pixel actually represents a volume, as in many types of MRI, CT, or other medical imagery data), and a zeta map corresponding to the image can be produced.

In order to perform segmentation of anomalies in the zeta distance data, a thresholding algorithm is used, which segments zeta data points which are above (or below) a certain threshold. In some embodiments an adaptive threshold can be used, so as to improve segmentation performance. Where the zeta data is produced from image data, then the thresholding algorithm is applied to the zeta map, and a segmented image is produced.

Post-processing operations can then optionally be performed on the segmented data, for example to get rid of outliers. For example, where a segmented image is produced, connection analysis can be undertaken on the segmented pixels to determine clusters of adjacent segmented pixels, and a cluster size threshold applied to remove from the segmentation clusters smaller than a particular size (or conversely, greater than a particular size). In addition, if a non-segmented pixel is surrounded by segmented pixels, then that pixel is marked as segmented, such that clusters are complete.

The output of the process is segmented data, with anomalous data in the test data set segmented from normal data. In image data then anomalies in the image are highlighted. For example, where the image data is medical image data for example of a human brain, then pathological lesions in the image are segmented, and their extent mapped. This can help physicians in predicting the extent of disability that a pathological lesion may cause, and hence what treatment may be required.

There follows a more detailed discussion of the zeta distance score used in embodiments of the invention, and how it may be used to detect anomalies in data sets. There then follows a more detailed description of two specific embodiments, one of which relates to the segmentation of anomalies in image data generally, and the second of which is directed towards the automatic identification of pathological lesions in MRI images of the brain.

Zeta Distance Score

Empirical data often take the form of cases comprised of one or more features. A case is an instance of data, its features the variables that define it. The simplest cases have only a single variable, e.g. the length of a rod, the weight of sphere, or the uniform brightness of a surface. More complex datasets have cases with multiple variables, e.g. digitized photographs, volumetric magnetic resonance imaging, or geographic surface temperature measurements. For example, in a digitized photograph each pixel of each image is a feature of that particular case; for volumetric data each volume element (voxel, for short) is a feature. Here we use feature, variable, or dimension interchangeably to indicate the one or several aspects that make up an individual case.

A common problem in the analysis of high-dimensional data such as images, volumes, or video, is the automated identification of sets of cases whose features differ from those of some "standard" population, a process referred to as anomaly detection. Where the dimensionality of the data is high or the distribution of the population is complex, satisfactory solutions are very difficult to achieve because of the difficulty in deriving robust criteria of anomaly that adequately capture the variability of the standard set.

One simple measure of the anomaly of a given data point, x, is the average distance to its k-nearest neighbours, a measure known as gamma ($\gamma$) (Harmeling, Dornhege, Tax, Meinecke, & Müller, 2006):

$$\gamma_k(x) = \frac{1}{k} \sum_{i=1}^{k} d(x, nn_i(x))$$

Figure 1:
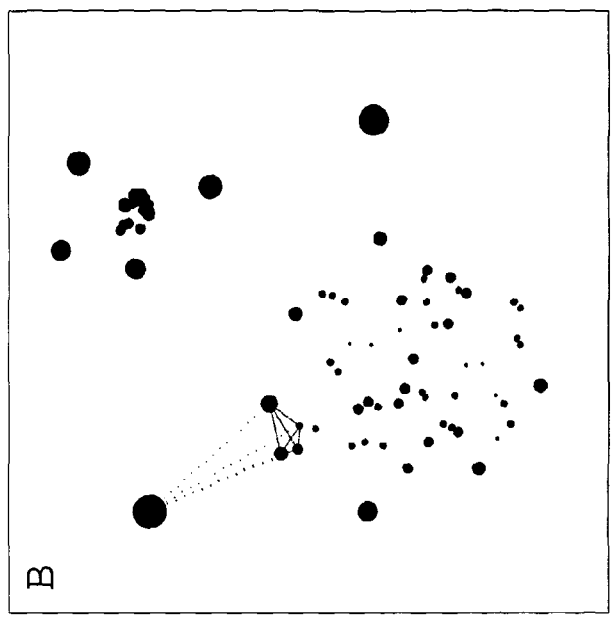
FIG. 1 is an example dataset used to illustrate distance measures.

A data point can be defined by n dimensions; where n>1 the simplest distance measure is the Euclidean distance (though other distance measures can be used). Unfortunately, $\gamma$ unhelpfully varies with the natural density of the points—dense regions will have low values and sparse regions high ones—making the labelling of anomalies density dependent (Harmeling et al., 2006). This is illustrated in FIG. 1, where a heterogeneous synthetic two-dimensional dataset is labelled by the $\gamma$ score of each point: the larger the diameter of a point the higher the $\gamma$ score (k=4). It is easy to see that members of the smaller, denser cluster will generally have a smaller value of $\gamma$ than members of the larger, sparser cluster even though they belong equally strongly to their respective clusters. Thus, if anomaly were to be determined by a fixed threshold of $\gamma$, either too many members of the sparse cluster will be labelled as anomalous or too few of the denser one: it is easy to see that the score is confounded by local differences in density.

If one considers the "clique" of k-nearest neighbours and its inner relations, however, this problem can be eliminated. One can thus derive an alternative score, zeta ($\zeta$) that is the difference between the average distance from a point to its neighbours (an index of the anomaly of the point in relation to its neighbours) and the average inner-clique distance of its neighbours (an index of the density of the neighbourhood clique):

$$\zeta_k(x) = \frac{1}{k} \sum_{i=1}^{k} d(x, nn_i(x)) - \frac{1}{k(k-1)} \sum_{i=1}^{k} \sum_{j=1}^{k} d(nn_i(x), nn_j(x))$$

FIG. 2 shows the same synthetic data labelled by $\zeta$, with the calculation for one point graphically illustrated: the first term is indicated by the dotted lines, the second by the solid lines. The lines illustrate for one outlying point the distances on which zeta depends, given k=4. Note that the anomaly score is now not dependent on density, with points equivalently anomalous to their respectively clusters correctly identified as such. Therefore, comparing the two clusters, it is easy to see that in contrast with $\gamma$, variations in density do not disturb the score here.

The $\zeta$ score, then, offers an approach to defining anomaly that is much more flexibly adaptive to inhomogeneities in the distribution of the standard data than any other existing k-nearest neighbour approach. By varying k, the algorithm can be optimized for datasets with different scales of variability. Although previous implementations have used a single value of k—the same for the nearest neighbours as for the clique—it is possible to have two different values: $k_1$ for the neighbour distances and $k_2$ for the clique distances.

This approach, originally conceived in the context of network intrusion detection (Rieck & Laskov, 2006), has a number of advantages. First, it is conceptually very simple. Second, it requires only one or two (where two different values of k are used) parameters to optimize for a given dataset. Third, it adapts optimally to data of any complexity. Fourth, it is agnostic about the features of anomalous cases, relying entirely on the features of standard ones, thereby allowing excellent performance on data to which it is naive. Finally, it is algorithmically—and therefore computationally—easy to implement.

Application of Zeta Distance Score to Detection of Anomalies

We have seen that a prerequisite for the application of $\zeta$ anomaly detection is a "standard" dataset—the concept of anomaly is only applicable with reference to some kind of standard population. The optimal properties of the standard dataset will vary from one application to another, being determined by the nature of the data and the anomalies one wishes to detect.

Here one can distinguish between two kinds of use: the detection of anomalous cases and the detection of anomalous features of cases. In the former, all the features of a data sample are used together, and the aim is to identify anomalous cases as a whole; in the latter, each feature is treated more or less independently and the aim is to identify anomalous features, the anomaly of the entire case being secondary to that. In essence, the test datum in the second use is a part of each case, one or a subset of its features, treated more or less independently from the rest. Any conclusion about anomaly will therefore be specifically about that feature or subset of features.

In either event, the derivation of any anomaly measure depends on being able to compare every feature of a case to every corresponding feature of a standard set of cases that define what non-anomalous is i.e. a "normal" standard data-set. This introduces two prerequisites for any application. First, each feature of each case must be identifiable, and second, we must have a set of standard cases to make comparisons against.

The first requirement may be automatically satisfied by the nature of the dataset. For example, if each case is a two dimensional image of a highly stereotyped object (e.g. a printed circuit board), captured from an invariant point of view, each feature—here each pixel—of the set of images will be directly comparable because its spatial location in relation to the object will be invariant. That is, in every image the location of a pixel on the image grid will correspond to the same part of the object being imaged: a pixel's location is a sufficient identifier of the feature the pixel records. This idea is obviously generalizable to other kinds of data: the key concept is a pre-existing direct correspondence between the parameterization of the image and the parameterization of the object.

Conversely, there are situations—such as the analysis of three dimensional images of the brains of different patients—where the correspondence between each feature of each case is not available by default but must be derived for each dataset. Here we require a pre-processing step where the features of every case are matched to every other so as to ensure that the same feature is compared across the entire dataset: a process referred to in the imaging domain as "co-registration". The characteristics of the optimal co-registration step will depend on the nature of the differences between cases: either linear or non-linear transformations may be necessary. The method of identifying the correspondence between homologous features need not be specified here: any measure of identity or similarity may be employed.

The second requirement is an obvious entailment of the notion of anomaly: we need a standard by which anomaly can be judged. Clearly, the nature of the anomaly will depend on the nature of the standard and cannot be specified generally. Equally, we cannot say independently of any particular dataset and application how many cases a standard dataset will need to contain: this is a matter that has to be determined empirically.

Once we have a dataset of sufficient size for the application in hand, and with the features of each case to be compared identified, we can proceed to the application of $\zeta$ anomaly detection. Here there are two further decisions to make. First, we must determine whether or not the data values of each feature need to be transformed so as to optimize the anomaly detection: such transformations may take the form of normalizing or centering of the data. Second, if each case has more than one feature (as will tend to be the case for most applications) we must decide whether to apply $\zeta$ in a mass-univariate or multivariate way.

If the former, then the $\zeta$ calculation is applied iteratively and independently to each feature across the dataset, ignoring correlations across features; the anomaly of a specific feature of a case, rather than of the case as a whole, will therefore be identified. For example, when applying $\zeta$ to a set of images each feature is a pixel and therefore a $\zeta$ calculation is performed at every pixel independently. The result will therefore be a $\zeta$ image of the same dimensionality as the original data where each pixel is labelled by its anomaly from the set of pixels at the same location across the dataset.

If the latter, then we must decide whether to take all the features together, or a series of subsets. Returning to the two-dimensional picture example, here all the pixels may be taken together, with each pixel defining a dimension of the data points on which the anomaly calculation is performed, resulting in a single anomaly value per picture or case. If a subset of n>1 features is taken (e.g. a grid of 3×3 pixels) each data point entered into the anomaly calculation will be defined by the dimensions in the subset, and the output of the calculation will be a series of $\zeta$ values per case corresponding to the number of subsets.

Note that whichever approach is taken, the features on which the anomaly detection is performed need not be the native parameters of the data, such as the actual pixel values of an image. Where the number of dimensions is high, it may be desirable to embed the data into a lower-dimensional space and perform the $\zeta$ calculation in this simpler space. Just as in the foregoing, here we can take a univariate or a multivariate approach.

The outcome of the $\zeta$ calculation is a set of real numbered values corresponding to the degree of anomaly of the corresponding point. Depending on the application, it may be desirable to transform the real numbers into categorial or binary values. For example, we might wish simply to distinguish normal from abnormal cases rather than register the precise degree of anomaly. Such discretization can be done by the use of simple thresholding based on a criterion value chosen to suit the application in hand, or more sophisticated algorithms, such as adaptive thresholding, may be used.

First Embodiment: Anomaly Segmentation in Image Data

A first, general, embodiment of the invention applicable to segmentation of anomalies in image data is shown in FIGS. 3 to 7, and described next.

Figure 3:
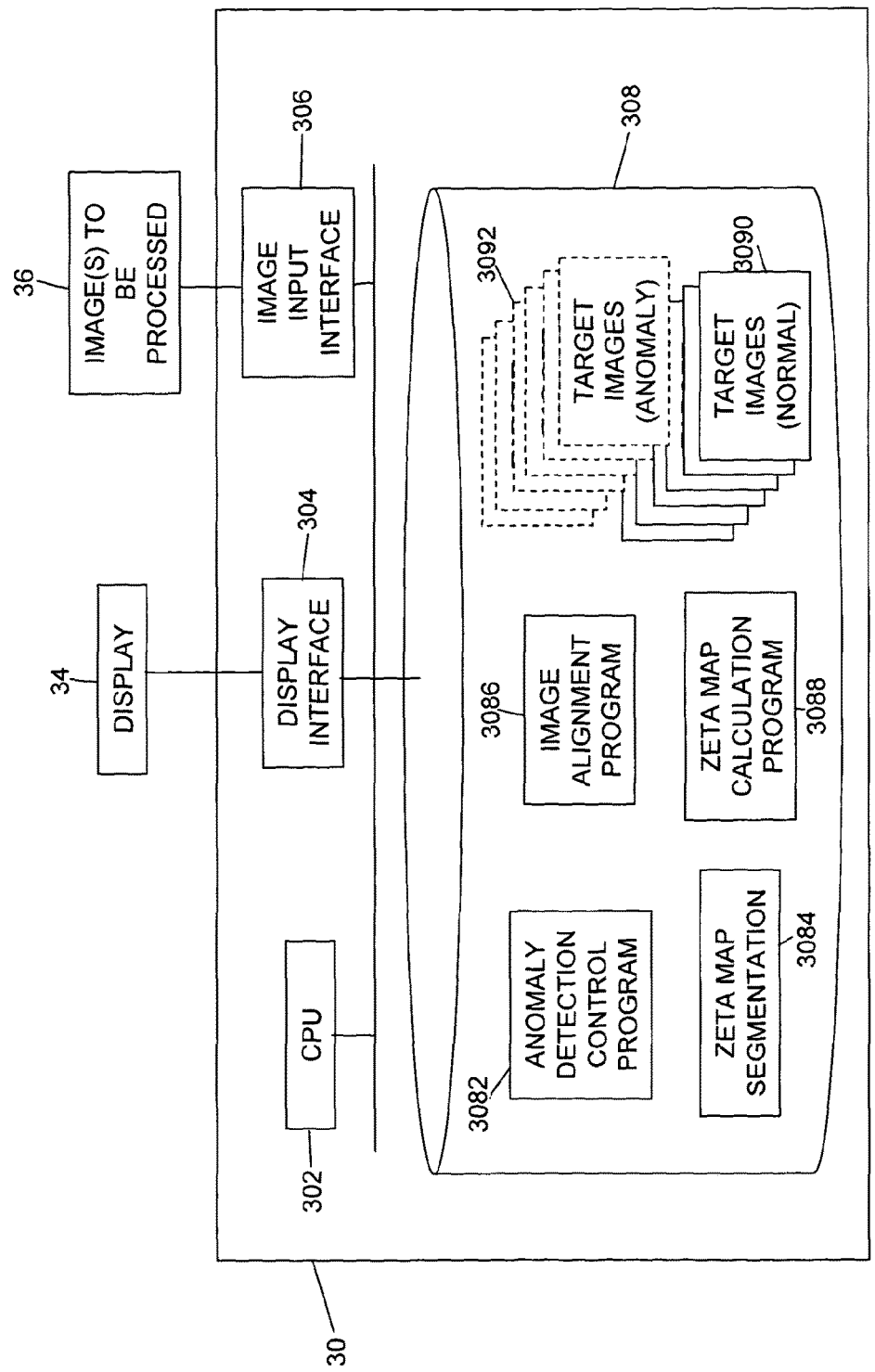
FIG. 3 is a block diagram of an apparatus according to an embodiment of the invention.

FIG. 3 is a block diagram of an apparatus 30 for performing automated anomaly detection in image data according to a first embodiment. The apparatus 30 may, for example, be a general purpose computer provided with an appropriate input interface 306 so as to be able to accept image data 36, appropriate control software that controls a CPU 302 to process the data to perform anomaly detection, and a display interface 304 arranged to control a display screen 34 so as to be able to display the processed image data on the screen. In order to control the operation of the CPU 302 control software is provided stored on computer readable storage media 308, such as a hard disk drive or the like. The control software takes the form of anomaly detection control program 3082, zeta map segmentation program 3084, image alignment program 3086, and zeta map calculation program 3088. In order to allow anomalous data to be detected, a set of target or standard images 3090 representing normal (expected) data is stored, against which input image data can be compared to determine if it is anomalous. Please note that herein the terms "target" and "standard" are used interchangeably to refer to the standard data (for example images containing pixel or voxel data) that represents normal (expected) data values.

Alternatively or additionally, in one embodiment a set of target or standard images representing anomalous data may be stored. In such a case so-called "normal" data would then be detected by reference to how different it is from the set of anomalous data, although given the range of anomalies that may be encountered a comparison of input data against a set of target normal data is preferred, in that input data is then being compared against a more standard data set.

Figure 4:
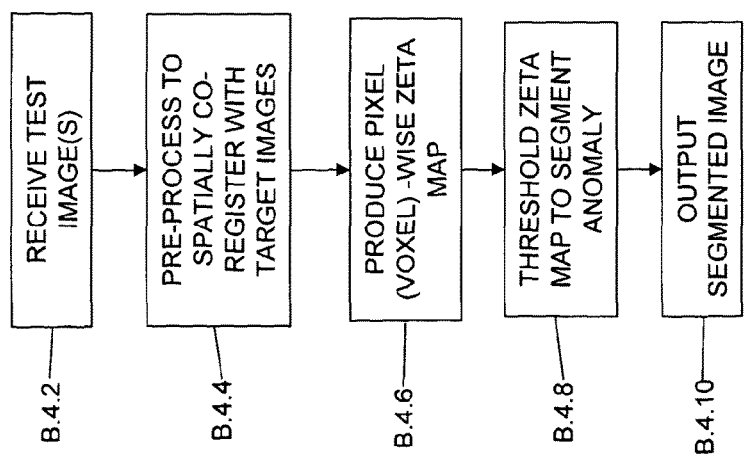
FIG. 4 is a flow diagram illustrating a method according to an embodiment of the invention.

The operation of the apparatus in FIG. 3 is illustrated in more detail in FIG. 4. Firstly, at block 4.2 a test image or images 36 to be processed is/are received, in this case at the image input interface 306. The input image data is temporarily stored on the computer readable medium 308, or may be stored in volatile memory, such as RAM (not shown). At this point in time, the CPU 302 operates under the overall control of the anomaly detection control program 3082, which controls the whole anomaly detection process, and in particular controls the image alignment program 3086, zeta map calculation program 3088, and the zeta map segmentation program 3084. The operation of each of these programs when run by the anomaly detection control program will be described later.

Having determined that a test image (or images) has been input and is waiting to be processed, the anomaly detection control program 3082 next causes the image alignment program 3086 to run, at block 4.4, which causes the input image or images to be aligned with the set of target or standard normal images (which themselves are already aligned). In particular, as described previously, the derivation of any anomaly measure depends on being able to compare every feature of a case to every corresponding feature of a standard set of cases that define what non-anomalous is i.e. a "normal" target or standard data-set. That is, in the case of image data as in the present embodiment, the features of the images should be aligned, such that a pixel (or voxel) or set of pixels (or voxels) representing feature X in the input image is compared with the corresponding pixel (voxel) or set of pixels (voxels) representing the corresponding feature X in the set of target normal images. This is illustrated in further detail in FIG. 5.

Figure 5:
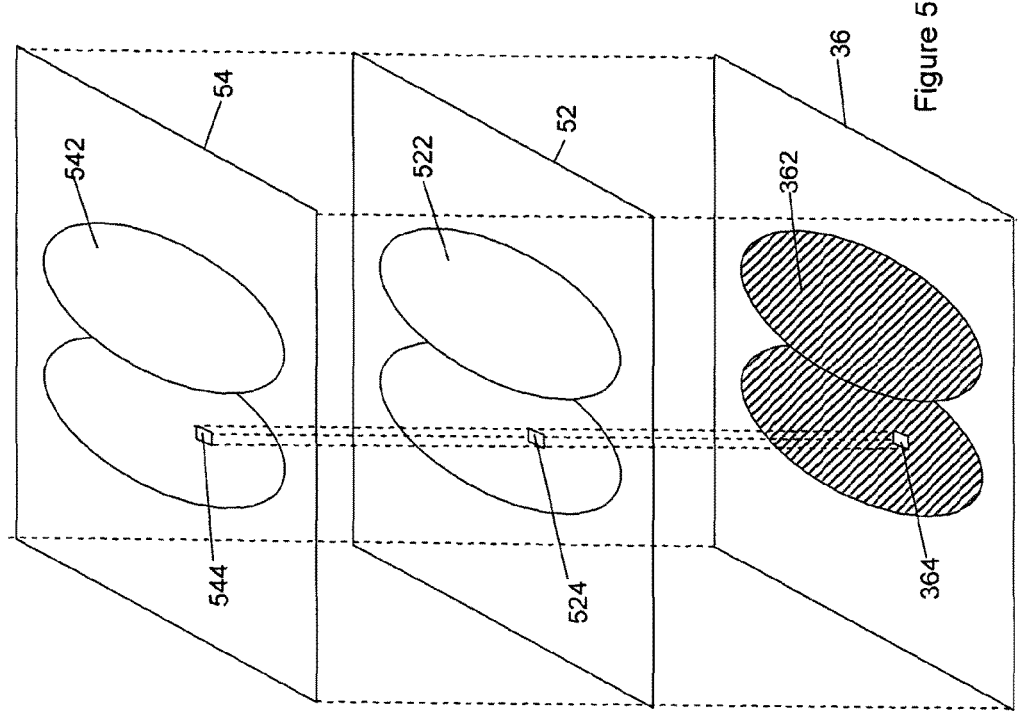
FIG. 5 is a drawing illustrating image feature alignment in an embodiment of the invention.

FIG. 5 illustrates a test image 36 that has been received, that contains an image of an object 562. For example, the image may be an MRI or CT image of a human brain. Standard "normal" images 52 and 54 are available, in the stored set of target or standard images 3090. The target images 52 and 54 are already in alignment, in that pixel 524 in image 52, which is part of feature 522, corresponds to pixel 544 in target image 554 containing feature 542. Hence pixels 524 and 544 are known to already correspond to the same part of corresponding features 522 and 542 respectively, and since they are both representative of "normal" data should have but a small difference therebetween. In addition, the difference between pixel 524 and 544 should be similar to the distance between either of pixel 524 or 544 and the corresponding pixel in the aligned images of any other image in the target or standard data set.

Now consider test image 36 that has been input, and that contains feature 362. In order for allow proper comparison with the target images the feature 362 in image 36 needs to be aligned with corresponding features 522 and 542 in target images 52 and 54. At a pixel level pixel 364 forming part of feature 362 needs to correspond with pixels 544 and 524.

Such alignment, or co-registration, can be performed in any convenient manner, depending on the features in the images. Of course, by alignment or registration is meant that a virtual correspondence between the same pixels representing the same feature in the target images and the test image is obtained, such that when the zeta distance scores are found for each pixel or group of pixels the scores are being obtained using the correct pixel values as inputs—there is no point in calculating distance measures between pixels that represent different features in an image, as there will automatically be large differences therebetween.

As examples of alignment techniques that may be used, in one embodiment alignment of images may be performed under the control of a human, who views a test image overlaid on top of a target image, and manipulates the position of the test image in the viewing software until alignment is obtained. Alternatively, and depending on the image features, it may be that pattern recognition of distinctive features in the test image can be performed, and then the image automatically aligned with the corresponding distinctive features in the target images. Alternative image processing may be undertaken, for example edge detection of features in the test image, and then automatic alignment of the detected edges. In this respect, several image registration and alignment techniques are known in the art, which can be employed herein.

Figure 7:
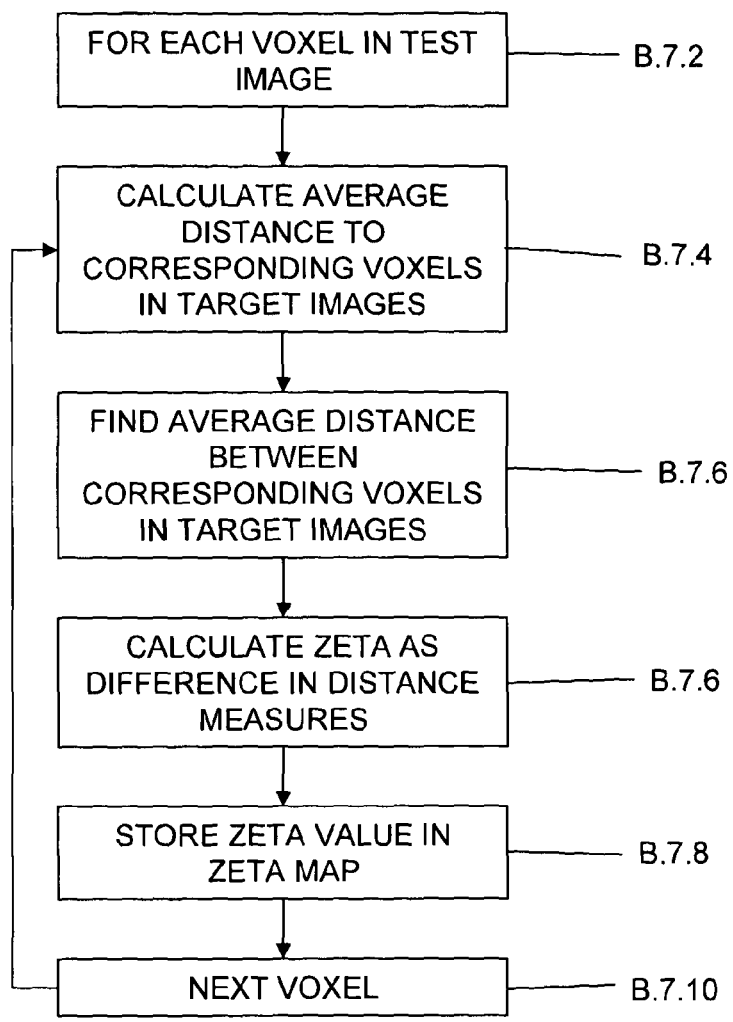
FIG. 7 is a flow diagram illustrating a zeta map generation method used in an embodiment of the invention.

Once an input image 36 has been aligned with the target images using the image alignment program 3086, at block 4.6 the anomaly detection control program runs the zeta map calculation program 3088 so as to cause zeta distance scores to be calculated. FIG. 7 illustrates the process that is performed in more detail.

More particularly, at block 7.2 a FOR processing loop is commenced to process each pixel or voxel in the test image being processed. For a particular pixel, at block 7.4 the average distance is calculated to k number of the corresponding (aligned) pixels in each of the target images that are closest to it (i.e. its nearest neighbours). This is the gamma distance discussed previously. By "distance" is meant the difference in pixel values, for example for grey-scale pixels the difference in corresponding grey-scale values. At block 7.6 the average distance between the k nearest neighbour pixels in the target image set is found. Once the average distance of the test pixel to the nearest neighbour target pixels has been found, and the average distance between the nearest neighbour target pixels themselves, then at B.7.8 the zeta distance score for the present pixel can be found as the difference between the average distance from test pixel to target pixels and the average distance between target pixels i.e:

zeta distance score=average distance from test pixel to corresponding nearest neighbour target pixels−average distance between nearest neighbour target pixels or $$\xi_k(x) = \frac{1}{k}\sum_{i=1}^{k} d(x, nn_i(x)) - \frac{1}{k(k-1)}\sum_{i=1}^{k}\sum_{j=1}^{k} d(nn_i(x), nn_j(x))$$

where x is the present test pixel, k is the number of nearest neighbour corresponding target pixels, nn are the corresponding nearest neighbour target pixels, and d(x,y) is any distance measure between x and y.

Once found for the present pixel being processed the zeta distance score is stored in a zeta map at a position corresponding to the position of the test pixel in the image. This is performed at block 7.10, and at block 7.12 an evaluation is performed as to whether all the pixels in the image have been processed. If this is the case then the zeta map will be complete and processing of the zeta map calculation program 3088 can end; otherwise the next pixel in the image is selected, and processing returns to B.7.4 so that it can be processed, and a zeta distance score calculated.

Figure 9:
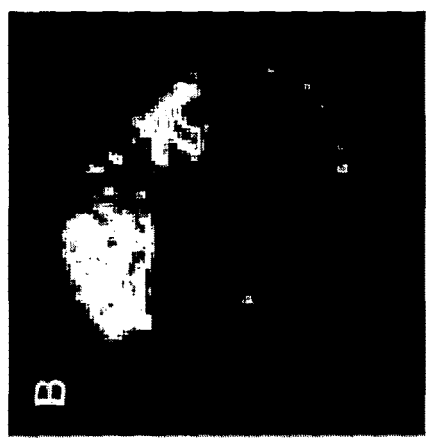
FIGS. 9A-D illustrate example lesion segmentation using manual segmentation (FIG. 9C), and zeta based segmentation according to an embodiment of the invention (FIG. 9D)
Figure 9:
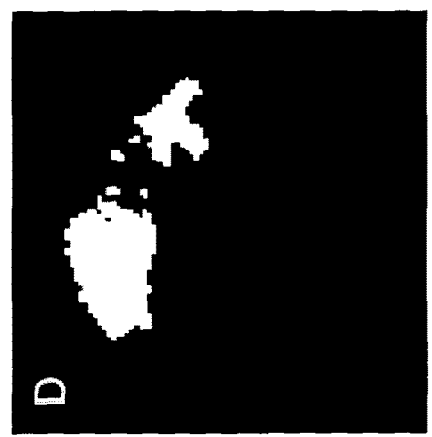
Figure 9:
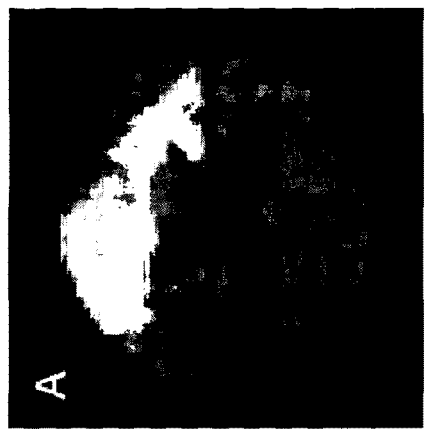
Figure 9:
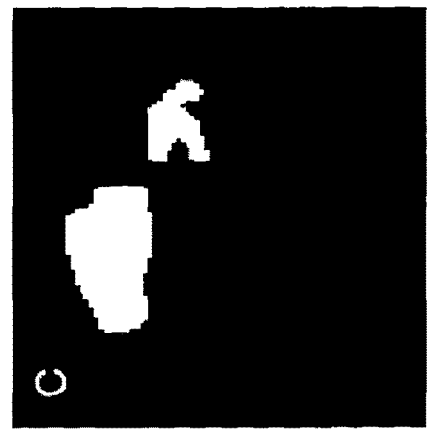
Figure 10:
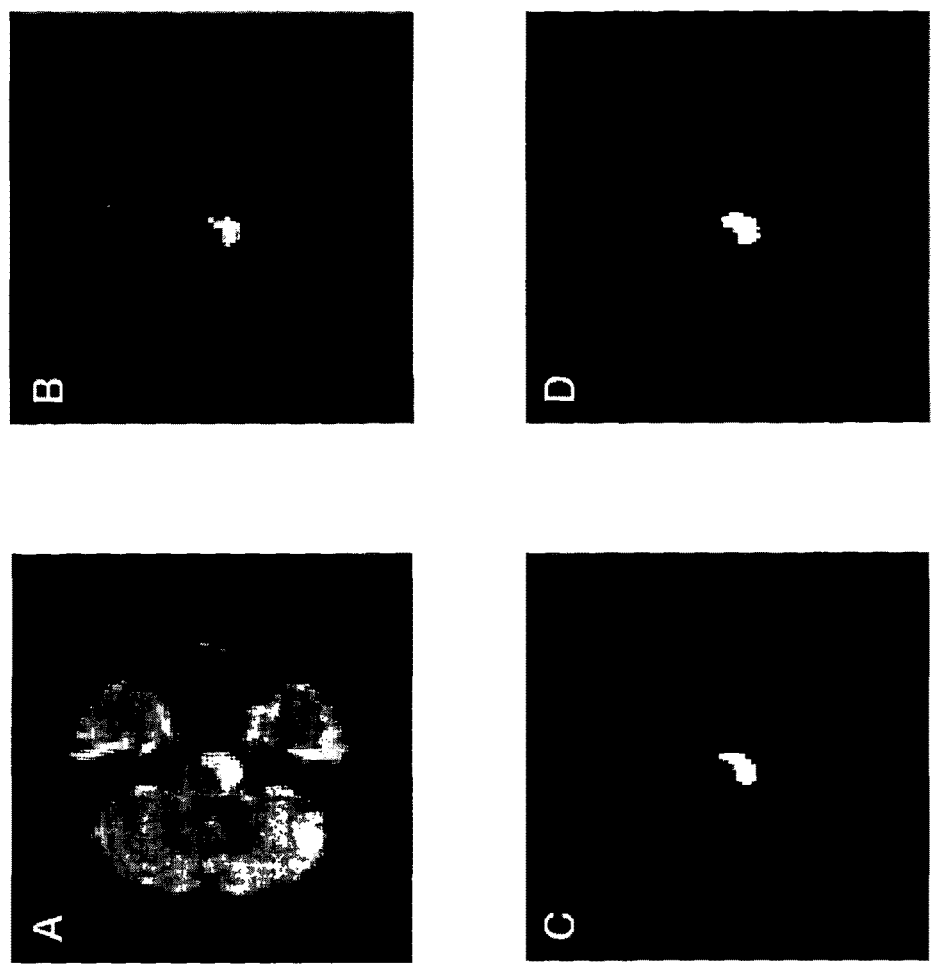
FIGS. 10A-D illustrate example lesion segmentation using manual segmentation (FIG. 10C), and zeta based segmentation according to an embodiment of the invention (FIG. 10D)

Once the zeta map calculation program 3088 has finished operating then a zeta map will have been obtained containing zeta distance scores for each pixel (voxel) in the test image. FIGS. 9 and 10 illustrate examples of a zeta distance score map. In each of FIGS. 9 and 10 image A illustrates an example test image 36, in this case an MRI slice image of a pathologically lesioned brain. Image B in each sequence illustrates a zeta distance map that has been calculated by comparing the test image against a set of normal brain images (not shown). Images C and D in each sequence will be discussed later.

Having obtained a zeta map for an input image, returning to FIG. 4, next at block 4.8 the anomaly detection control program 3082 will cause the zeta segmentation map program 3084 to operate, so as to apply a thresholding operation to the zeta map so as to identify and segment pixels that are anomalous, based on their zeta distance scores. In one embodiment a simple fixed threshold may be used, with the zeta distance score for each pixel in the zeta map compared against the threshold, and a pixel being identified as anomalous and hence segmented if its zeta distance score is greater than the threshold.

Figure 6:
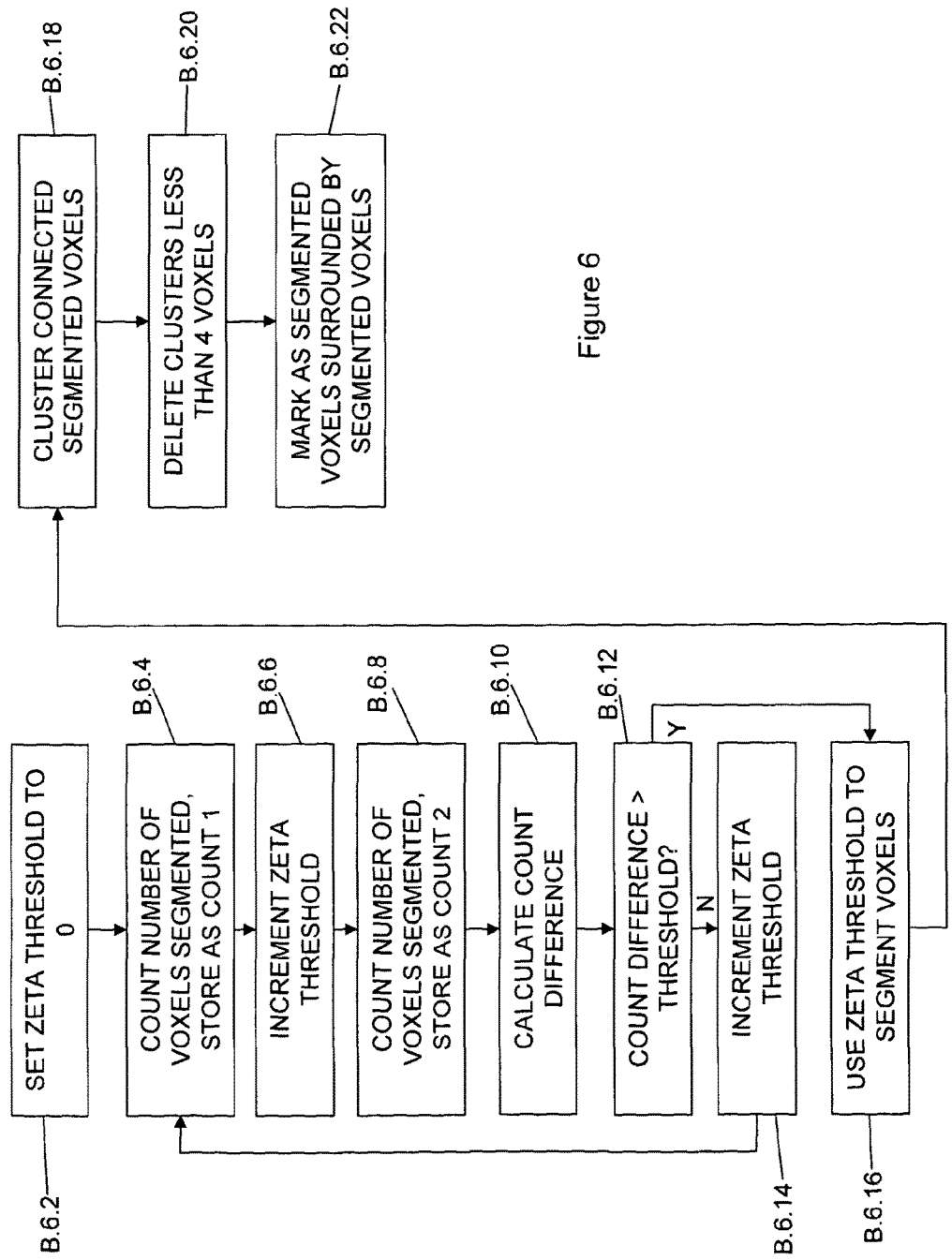
FIG. 6 is a flow diagram illustrating a segmentation method used in an embodiment of the invention.

However, in another embodiment an adaptive threshold may be used, with the advantages that a more intelligent segmentation is obtained. FIG. 6 illustrates one adaptive thresholding algorithm that may be used by the zeta map segmentation program 3084 in an embodiment of the invention.

More particularly, at block 6.2 the zeta map segmentation program 3084 accesses the zeta map, and sets a zeta score threshold to 0. At block 6.4 the number of pixels in the zeta map greater than the present threshold is counted, and stored as a variable count_1. At block 6.6. the zeta threshold is then increased, and a second count undertaken at block 6.8, and stored as a variable count_2. Because the threshold has been increased then count_1 should be less than count_2.

At block 6.10 the difference between the two counts is obtained, and at block 6.12 the difference is compared to a threshold, which corresponds to a predetermined number of pixels difference in segmentation between the two threshold levels. If the threshold is not met, then at block 6.14 the zeta threshold is incremented again, and processing returns to block 6.4. If the threshold is met, the present zeta threshold is used to segment the zeta map at block 6.16. This results in a discretized map, where pixels that have zeta distance scores above the threshold are segmented and given a maximum value, and pixels whose scores are below the threshold are given a minimum value.

The overall effect of the adaptive thresholding algorithm described is that by incrementing the threshold and then looking at the difference in how many pixels are segmented between the two subsequent levels of threshold then the threshold used automatically adapts to the background level of zeta distance score in the zeta map, and adjusts upward until the predetermined number of segmented pixels is met. This predetermined number is preferably set at a number based on empirical observation that results in background pixels being unsegmented and anomalous pixels segmented.

Once the adaptive thresholding has been performed and a discretized zeta map obtained, in the present embodiment additional processing steps are performed, although in other embodiments these need not be performed, or in still further embodiments only some of the steps may be performed. More particularly, at B.6.18 a connected pixel analysis in the segmented zeta map is undertaken, to identify clusters of segmented pixels. A cluster size threshold is then applied at B.6.20, wherein clusters of pixel size less than a predetermined number (in this case 4) are deleted from the segmentation i.e. are no longer categorised as anomalous. In addition, in the present embodiment an additional step at B.6.22 is performed, wherein pixels that are not segmented but which are completely surrounded by segmented pixels are marked as segmented. Whether this additional processing step is required will depend very much on the application, and the nature of what is being imaged; for example, in imaging pathological lesions in brains, it makes no sense for pixels within a lesion not to be marked as anomalous since the tissue within them cannot usefully function in complete disconnection with the rest of the brain At this stage, therefore, a zeta distance score map has been produced, and anomalous pixels identified using an adaptive thresholding algorithm. In addition, two clean-up operations have also been applied to improve the results, in the form of the deletion of insignificantly small clusters, and the identification of additional anomalous pixels when surrounded by other anomalous pixels. Image D in each of FIGS. 9 and 10 illustrates a segmented zeta map produced according to the above, and based on zeta map of image B. Image C in each case shows a manually segmented image, for comparison with the automated segmentation of the present embodiment.

Returning finally to FIG. 4, once the zeta map segmentation program 3084 has produced the segmented zeta map, the anomaly control detection program 3082 stores the segmented zeta map, and also causes the display interface 304 to display the segmented map on display 34, so that it may be viewed by a user. The segmented map at this point in time then shows to the user where anomalous features in the image have been automatically identified, and the extent of the anomalous features is visually apparent, and can also be measured from the image. The operation of the anomaly detection program is then complete.

Second Embodiment: Lesion Segmentation in Brain Imaging

As explained in the first embodiment, zeta anomaly detection may be applied to any high-dimensional data set. In the present embodiment we explain the application of zeta anomaly detection to the identification and characterization of images of focally damaged human brains. Here the raw data takes the form of a three-dimensional matrix of real-numbered values (voxels) recording the signal intensity within each location of the brain in each patient. We have one or more test images which we wish to examine for anomaly and a series of normal images that serve as the standard against which the anomaly is judged. There may be one or more volume images for each patient, each image using a different magnetic resonance imaging (MRI) sequence and thus capturing different characteristics of the tissue being imaged. Such data generally requires two kinds of pre-processing; first—since the image values are non-absolute—centering and rescaling of the values of each image, and second—since the brains of patients differ from each other—co-registration of the images so that the corresponding features of the brain can be compared across a group of patients. Following these steps, the zeta calculation is performed on each voxel independently (the mass-univariate approach), where each data point is either a scalar value for the signal at each voxel or (if multiple images per patient are used) a vector of values, with the resultant distances being Euclidean or some other distance measure. In either case, the result of the calculation is an image of the same dimensions as the original where each voxel has a zeta value reflecting the anomaly of the signal in the region of the brain corresponding with it. If desired, this real-numbered image can be discretized into a binary image where each voxel is labelled as anomalous or non-anomalous based on a chosen zeta threshold. The process is outlined in more detail below.

Pre-Processing

In order to generate a set of zeta maps we need two kinds of data: a set of target images of lesioned brains (in one or more imaging modality) and a set of reference images of non-lesioned brains with characteristics otherwise similar to the target set. In our example here we use for the former diffusion-weighted magnetic resonance imaging (DWI) data derived from 19 patients with recent stroke brain lesion, and for the latter DWI data from 65 patients investigated for possible stroke but with no radiological evidence of that or any other focal brain abnormality.

Figure 8:
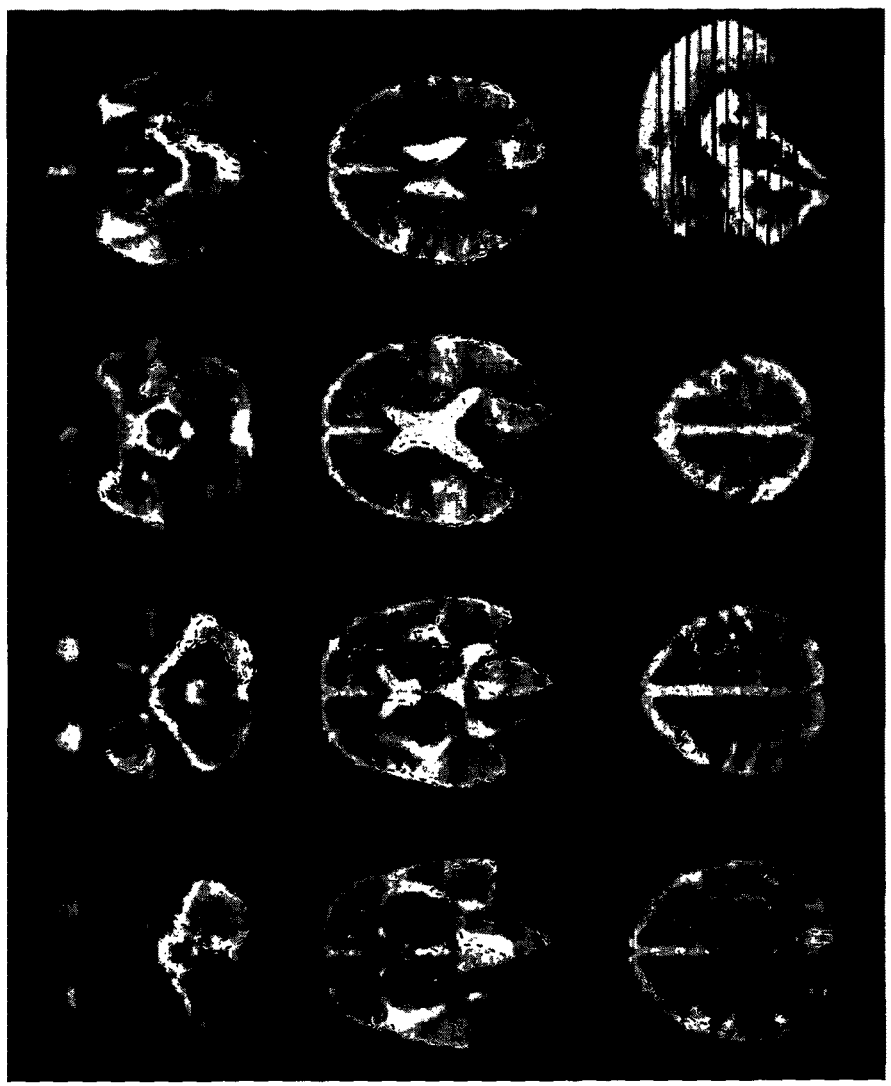
FIG. 8 illustrates example MRI images of brains lesions.

The data for each patient consists of diffusion-weighted echoplanar imaging (b0 and b1000) sampled at 1 mm×1 mm×6.5 mm resolution, and obtained on a GE 1.5T scanner in a single session. The b0 image is sensitive to the normal architecture of the brain (e.g. distinguishing grey from white matter) but insensitive to areas of damage. The b1000 has the converse characteristics, being poorly sensitive to tissue types but highly sensitive to the presence of (cytotoxic) damage. The lesioned brain images are unselected except for a minimum lesion size of 216 mm$^3$—note this value is considerably smaller than most of the significant lesions observed in clinical practice ensuring that our evaluation is maximally rigorous. FIG. 8 shows a plot of the overlap of lesions—the overlay shows the distribution of voxels affected by at least one lesion (shown outlined in white). Note the variability in size, location and morphology. The underlay is the mean of the normalized B0 images of the lesion-free subjects. The figure was generated using MRI-cron (http://www.sph.sc.edu/comd/rorden/mricron/).

As noted earlier, the computation of zeta and any other voxel-wise statistic that compares a test image against a reference set of images implies knowledge of the spatial correspondence between the two. In other words, it must be preceded by an inter-subject co-registration step in which spatially homologous voxels in the test and reference brain images are brought into alignment: a process referred to as normalization.

In the presence of a lesion, normalization can be difficult since the lesioned region will tend to interfere with the image matching process. One can minimize this effect by obtaining more than one imaging sequence and performing the normalization on the sequence that is least sensitive to the lesion, as we do in this embodiment (see below). Alternatively, one can mask out the lesioned region (Brett et al., 2001) or fill it in with signal from the homologous region in the contralateral hemisphere (Nachev, Coulthard, Jäger, Kennard, & Husain, 2008), but this of course implies knowing the spatial parameters of the lesion.

Another option is to combine the normalization and tissue segmentation (white and grey matter, and CSF) into a single generative model, explicitly modelling the lesioned area as falling within a third, abnormal class. This procedure may be used iteratively, with the lesioned class derived from one run serving as a prior for the next (Seghier, Ramlackhansingh, Crinion, Leff, & Price, 2008). Since the departure of the signal at each voxel from the expected value for grey and white matter respectively determines the extent to which it is likely to disturb the matching process, this approach would seem excellent at minimizing the impact of the lesion. As a means of lesion segmentation, however, it can only be expected to be satisfactory in the special case where the optimal normalization modality and the optimal lesion identification modality are the same. Clearly this is neither inevitable nor desirable since the more the lesion disturbs the tissue contrast the worse the normalization, and the greater the tissue contrast the more likely it is to interfere with lesion segmentation.

Our approach in the present embodiment is therefore to derive the normalization parameters by applying the unified normalization and segmentation procedure implemented in SPM5 (available from www.fil.ion.ucl.ac.uk/spm/software/spm5/) to the b0 image—which has low lesion contrast and reasonable grey/white matter contrast—and then to apply them to both b0 and b1000 images, thus minimizing the impact of the lesion on the normalization process. Note that although the unified segmentation algorithm will implicitly segment the lesion (by allocating voxels falling within it to a third class) it will do so only as far as the lesion is detectable on the b0, which is obviously of limited use. As part of the normalization, the images were re-sliced to the resolution of 2 mm×2 mm×2 mm per voxel.

Clearly, this step is only practicable if the b0 and b1000 images are already in registration. Since each pair is taken in a single run, the images are bound to be close; nonetheless we first rigid-body co-registered the b0 to the b1000 using SPM5's standard co-registration routine before performing the normalization outlined above. Note that this step is robust to the difference in lesion signal between the two scans because it is an affine-only transformation.

All further operations were performed on the normalized images. For the purposes of evaluating the algorithm a set of artificially lesioned brain images was generated by replacing in each image and each sequence (b0 and b1000) the signal intensities in the voxels corresponding to each lesion as defined by the manual mask with the signal in the real lesion (Brett et al., 2001). Since unlike CT scans, MRI images do not have a standardized intensity scale, each transplantation step was preceded by equating the global intensity of the donor and recipient images. This was done by generating a non-parametric density estimate (Botev, 2007) for each image and transforming the donor so that its dominant within-brain signal peak (corresponding to the commonest lesion signal intensity) matched the equivalent peak in the recipient image (mode normalization). This procedure ensured that the transplanted signal was as close as possible to what abnormal signal might have looked like had it been present in the recipient; without it, unrealistic global variations in the signal would have clouded our assessment of the algorithm's adequacy. In the second embodiment the image alignment program 3086 may be adapted to operate as described.

Deriving the Zeta Score

With all the images in alignment we next calculated a voxel-wise zeta map for each lesioned image. Calculation of the zeta map is substantially the same as described in respect of the first embodiment, but as zeta may be based on any distance measure, in the present embodiment we chose a two dimensional Euclidean distance, with one dimension specified by the b1000 image and another by the same image smoothed with an Gaussian kernel of 4 mm FWHM isotropic.

More particularly, within the present embodiment two sets of target images of normal brains were produced and used as target images, one set of which is a set of b1000 MRI images, and the second set of which is are smoothed versions of the same images. A b1000 image and the smoothed version are then dealt with as pairs. An identically smoothed version of the test image is also produced. The pairs of images are treated together, with each voxel position thereby having a vector of two values, one for the raw image and one for the smoothed version. The distance calculated for each voxel position in the test image is then the Euclidean distance between the vector for that voxel in the test image pair and the vectors for the corresponding nearest neighbour voxels in the set of standard images, the average giving us the gamma score for each test voxel. The same Euclidean distances are then also found between the nearest neighbour corresponding voxels in the different pairs of standard images, so that the zeta distance score can then be calculated. Again, within the second embodiment the zeta map calculation program 3088 may be adapted to perform the above zeta map calculation.

A zeta map (see FIGS. 9B & 10B) is real-numbered and dimensionless. One could use it directly to probe lesion-function relationships using either multivariate or mass-univariate inference in the conventional way. However, for the purposes of validation in the present embodiment we need to compare it to manual lesion segmentation, which necessarily generates a binary mask image. A thresholding operation is therefore applied, as described next.

Thresholding the Zeta Map

In the present embodiment the following heuristic procedure was used to find the optimal threshold, which procedure is substantially similar to the adaptive procedure described previously in respect of the first embodiment, and which can be performed by the zeta map segmentation program 3084. In particular the optimal threshold was generated by finding the point, starting at zero and incrementally ascending the function, at which the slope of the relation between the threshold and the volume of brain identified as lesioned became greater than $-1500$ voxels zeta$^{-1}$. A binary volume generated by thresholding at that level was then labelled on the basis of the connectivity of adjacent voxel, resulting in a collection of clusters of connected voxels. Next two refining steps were performed. First, all clusters containing fewer than 4 voxels were discarded as noise. Second, voxels labelled as normal that were completely surrounded by lesioned tissue were reassigned as lesioned. Clearly, whatever the radiological appearances such voxels could not be physiologically significant if they are completely disconnected from the rest of the brain. Note that in other embodiments the cluster size threshold below which clusters are deleted may be adapted so as to be other values.

Performance Evaluation

So as to evaluate the quality of anomaly detection in the present embodiment, the target and reference images were also used to create a synthetic dataset of 1235 artificially lesioned brains where each of the 19 lesions was "transplanted" into each of the 65 reference brains. This was done by extracting the lesion signal—as defined by manual segmentation—and inserting it into the homologous region of the reference image (see below). The point of this manoeuvre was to evaluate the algorithm's ability to distinguish lesioned from non-lesioned signal at the same location.

Manual Segmentation

In order to evaluate the present embodiment we require a ground truth or a standard: in the absence of anything better here this is defined as manual segmentation. Each lesion was therefore segmented by hand by a trained clinician (YM) with the aid of MIPAV's gradient, magnitude and direction live-wire edge-detection tool (Barrett & Mortensen, 1997). (http://mipav.cit.nih.gov/index.php). The manual segmentation was performed on normalized versions of each image (see below).

Two kinds of evaluation can be performed on the thresholded zeta maps. In both cases the ground truth is defined by manual segmentation. First, we can compare the automatic against the manual segmentations for the lesioned images (n=19), and second, we can do the same thing for the chimeric images (n=1235). The method of comparison here follows established practice, and uses the following simple whole brain measures:

$$\text{Sensitivity} = \frac{Voxels_{manual} \cap Voxels_{\xi}}{Voxels_{manual}}$$

and $$\text{Specificity} = \frac{(Voxels_{total} - Voxels_{manual}) \cap (Voxels_{total} - Voxels_{\xi})}{Voxels_{total} - Voxels_{manual}}$$

Here $Voxels_{manual}$ represents the ground truth of the lesion, while $Voxels_\square$ represents those detected by the new method.

By varying the threshold at which the zeta volumes are binarized (without the aid of any elaborate thresholding method) we can also obtain receiver operating characteristic (ROC) curves for the zeta method, which we have performed for the native images.

Results

We examine first the native lesion dataset and then move on to the chimeric data.

Figure 11:
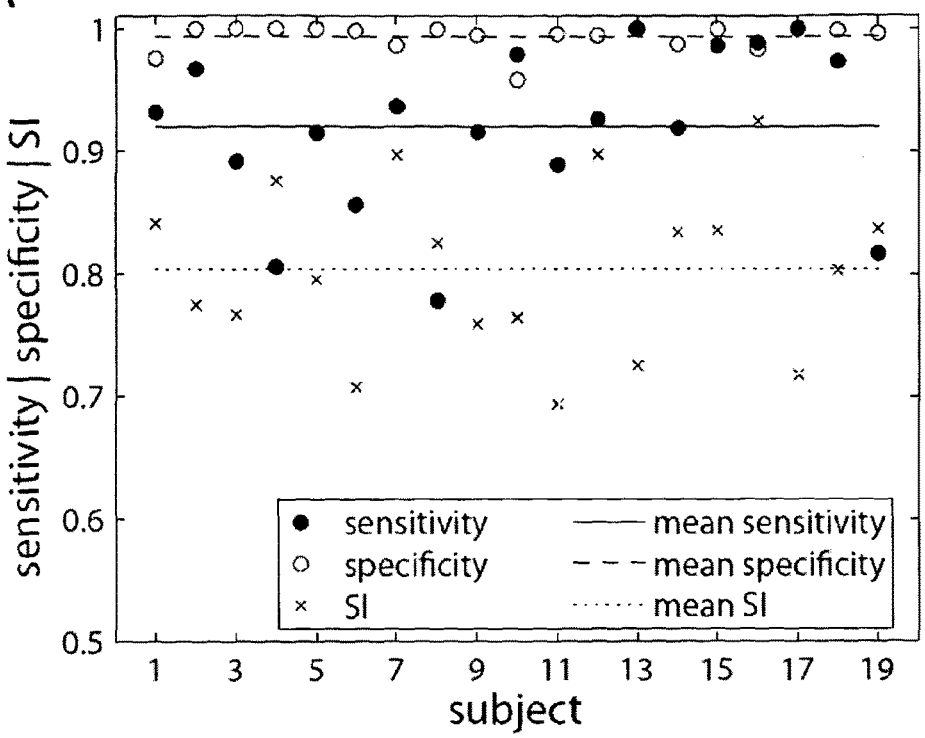
FIG. 11 is a plot of sensitivity and specificity in the automated lesion detection of an embodiment of the invention against a manual segmentation.

Native Lesions. Since lesion and subject are not dissociable here we have a single set of sensitivity and specificity values for each zeta segmentation, as judged against the manual ground truth. These values are given in FIG. 11, which shows plots of sensitivity and specificity scores for each native lesion. A zeta map was created for each lesion image and a discretized version was compared against the ground truth defined by manual segmentation. Note that the mean sensitivity (solid line) and specificity (dotted line) for the 19 native lesions are excellent. In particular the mean value for sensitivity was 0.918, and for specificity, 0.993, with very modest variability across the lesions despite substantial differences in their spatial and signal characteristics. Perhaps most importantly, the minimum values for these parameters (sensitivity=0.78 and specificity=0.96) for any image were remarkably high, demonstrating excellent consistency of performance.

Figure 12:
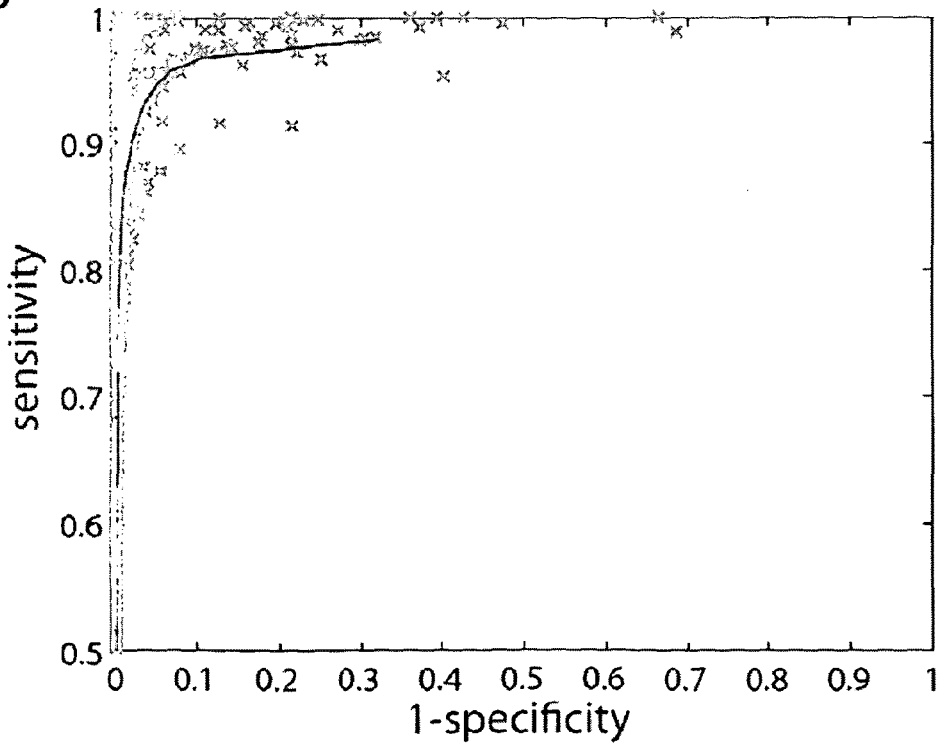
FIG. 12 shows an ROC curve of the results obtained.

Illustrating the performance of zeta without the thresholding heuristic (the adaptive thresholding algorithm described earlier), we can derive an ROC curve for the 19 native lesions for a range of thresholds. As FIG. 12 illustrates, the performance of the algorithm is very high, with the inflexion point of the mean ROC curve occurring very close to optimal (0, 1). In particular the plot shows the true positive rate (sensitivity) against the false positive rate (one minus specificity) of the 19 native lesions for different thresholds of zeta. The mean scores for each threshold are represented by the solid black line.

Chimeric Lesions. Our chimeric lesions permit lesion-wise as well as subject-wise analyses depending on whether one compares the data across chimeras of each donor lesion, or of each recipient volume.

Figure 13:
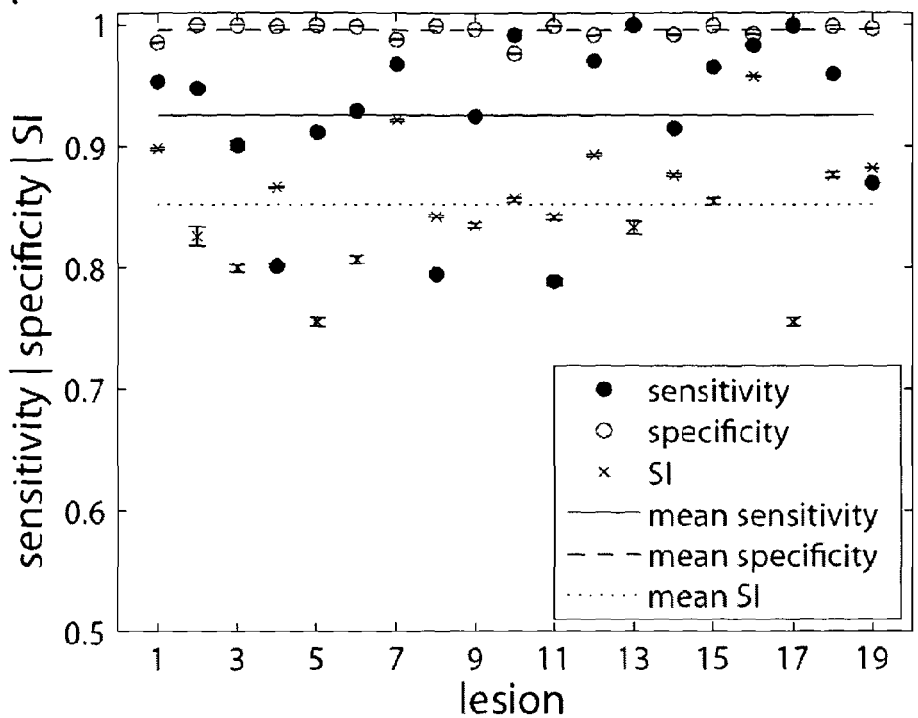
FIG. 13 is a plot of segmentation performance obtained using an embodiment of the invention.

The lesion-wise assessment showed a global mean for sensitivity of 0.925 (SE=0.061) and specificity, 0.995 (SE<0.016). As illustrated in FIG. 13, plots of mean sensitivity (triangles) and specificity (circles) for each lesion calculated using all 1235 chimeric lesions are shown, with each set containing 65 brain volumes. The error bars are standard errors. Note that both sensitivity and specificity vary little across the 19 lesions, illustrating the robustness of the method to variations in lesion spatial and signal characteristics. In particular the range of means for sensitivity and specificity were 0.789-1.00 and 0.977-1.00 respectively. This remarkably narrow variability illustrates the robustness of the method to variations in lesion spatial and signal characteristics.

Figure 14:
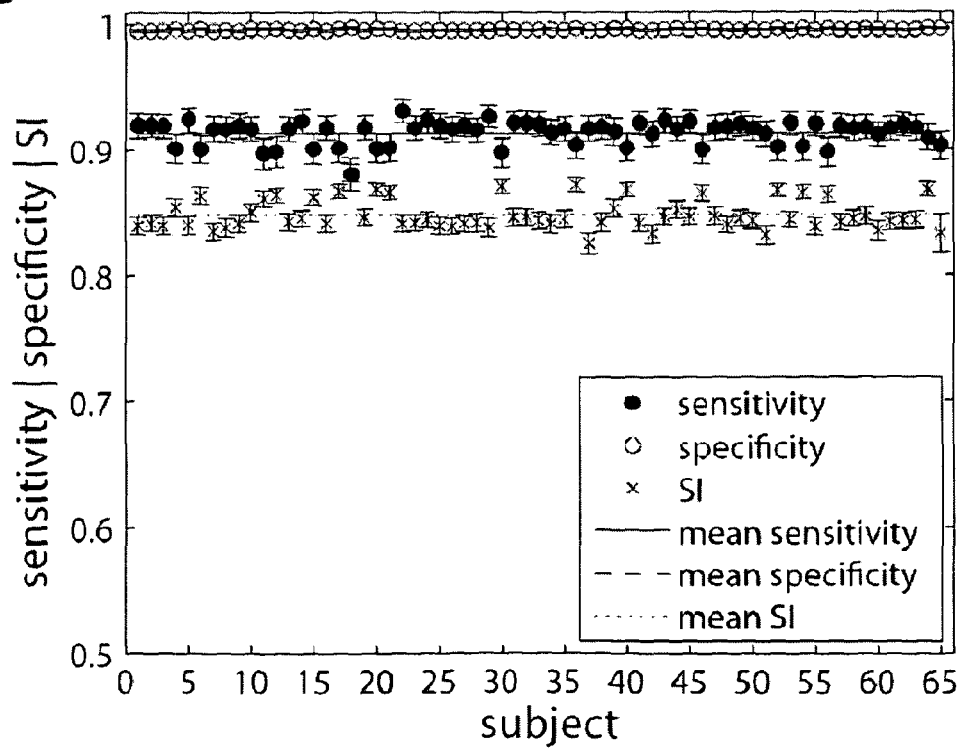
FIG. 14 is a plot of segmentation performance obtained using an embodiment of the invention.

The subject-wise assessment showed (naturally) the same global means, with standard errors now 0.0327 and <0.0084 for sensitivity and specificity respectively. FIG. 14 shows plots of mean sensitivity (triangles) and specificity (circles) for each subject calculated using all 1235 chimeric lesions, with each set containing 19 brain volumes. The error bars are standard errors. Note that both sensitivity and specificity vary little across the 19 lesions, illustrating the robustness of the method to variations in normal signal and artefact. In particular the mean values for the test parameters, averaged across all lesions for each of the 65 recipient subjects possess minimal variability in the values—sensitivity 0.895-0.941, specificity: 0.995-0.997 reflects the method's resistance to noise and artefact.

Second Embodiment: Conclusions

In the first and second embodiments we have described a method for the automated unsupervised anomaly detection of high-dimensional data with an example application in the second embodiment to MRI. Evaluation of its fidelity against manual segmentation in the context of DWI has shown excellent performance across a range of subjects and lesion parameters.

Within the embodiments a set of "standard" cases is required whose minimal size depends on the nature of the anomaly. For the brain imaging application we have examined (the second embodiment), the variability of the lesion contrast-to-noise ratio is important; here we have shown that excellent results may be obtained with DWI using a modest set of 65 images. Given that DWI is quite markedly prone to high signal artefacts that affect only a small proportion of images, this value should not be an underestimate. In any case, this is not a serious limitation given the ease of collecting normal cases.

In addition within the embodiments it should be possible to find the correspondence between the same features of the set of cases being examined. In the second embodiment, this is the process of normalizing the lesioned and reference images into a common stereotactic space. By using two different sequences—one with high lesion contrast and low normal tissue contrast, and another with the converse properties—it is possible to achieve this even in the presence of lesions that could significantly disturb the normalization process.

The use of zeta segmentation for anomaly detection in datasets has several advantages, as described next.

One advantage is that zeta segmentation is able to handle highly heterogeneous data. The signal distribution need not be Gaussian or even monotonic: multimodal data is readily accommodated. This feature is illustrated in our DWI dataset of the second embodiment where highly variable high intensity artefact in the polar frontal and temporal regions normally makes segmentation in the vicinity very difficult. Zeta segmentation, however, is able easily to distinguish artefactually high signal in such areas from true lesion signal elsewhere (See FIG. 10).

Another advantage is that zeta segmentation can be applied to any dataset without prior knowledge of the features of the anomalies to be detected. In the brain imaging example of the second embodiment, we need no priors for the number of lesions, their pattern of distribution, their signal intensity, and other features automated segmentation algorithms frequently demand from the user. The segmentation therefore does not require information that is normally difficult or impossible to acquire. This feature also allows comparisons between separate segmentations from images of different modalities to be readily made. Where an algorithm is intrinsically tied to a specific modality (e.g. where segmentation and normalization are unified) this is impossible or much harder to achieve.

Moreover zeta segmentation has only one parameter to adjust, the size of the clique, k. The lower the value of k the smaller the scale of signal inhomogeneity to which the algorithm is sensitive. It is also possible to adjust k for each voxel, in essence to pass to the algorithm a k "image", in response to sequence-specific voxel-wise variations in the pattern of inhomogeneity, perhaps because of distortion or artefact. If binary maps are required other parameters come into play depending on the chosen heuristic for thresholding; although this is not necessary if the zeta maps are used directly.

In addition zeta segmentation naturally produces a real-numbered image where the anomaly of each voxel is given a continuous index. In the brain imaging domain of the second embodiment, since there are rarely any physiological grounds for drawing a sharp threshold at which neural tissue ceases to be active this may be a more appropriate instrument than any kind of binary measure. The zeta maps can be directly used in making brain-behaviour inferences or relating patterns of damage to other factors of interest. Clearly, the same may apply for other applications where a continuous measure of anomaly may make more sense than a discrete label.

Finally, zeta segmentation is fast. On off-the-shelf, consumer-grade hardware running Matlab the total computation time for each image (excluding normalization) was of the order of 6 minutes. Clearly, compiled code run on optimized hardware could be much faster.

Various further modifications, whether by way of addition, deletion, or substitution may be made to the above described embodiment to provide additional embodiments, any and all of which are intended to be encompassed within the scope of the appended claims.

REFERENCES

Ashburner, J., & Friston, K. J. (1999). Nonlinear spatial normalization using basis functions. *Human Brain Mapping*, 7(4), 254-266.

Barrett, W. A., & Mortensen, E. N. (1997). Interactive live-wire boundary extraction. *Medical Image Analysis*, 1(4), 331-341.

Botev, Z. I. (2007). Nonparametric density estimation via diffusion mixing. *The University of Queensland*, Postgraduate Series, November.

Brett, M., Leff, A. P., Rorden, C., & Ashburner, J. (2001). Spatial normalization of brain images with focal lesions using cost function masking. *Neuroimage*, 14(2), 486-500.

Fiez, J. A., Damasio, H., & Grabowski, T. J. (2000). Lesion segmentation and manual warping to a reference brain: intra- and interobserver reliability. *Human Brain Mapping*, 9(4), 192-211.

Harmeling, S., Dornhege, G., Tax, D., Meinecke, F., & Müller, K. R. (2006). From outliers to prototypes: ordering data. *Neurocomputing*, 69(13-15), 1608-1618.

Nachev, P., Coulthard, E., Jäger, H. R., Kennard, C., & Husain, M. (2008). Enantiomorphic normalization of focally lesioned brains. *NeuroImage*, 39(3), 1215-1226.

Rieck, K., & Laskov, P. (2006). Detecting unknown network attacks using language models. *Detection of Intrusions and Malware & Vulnerability Assessment*, 74-90.

Seghier, M. L., Ramlackhansingh, A., Crinion, J., Leff, A. P., & Price, C. J. (2008). Lesion identification using unified segmentation-normalisation models and fuzzy clustering. *Neuroimage*, 41(4), 1253-1266.

Bhanu Prakash K, Gupta V, Jianbo H, Nowinski W. Automatic processing of diffusion-weighted ischemic stroke images based on divergence measures: slice and hemisphere identification, and stroke region segmentation.

*International Journal of Computer Assisted Radiology and Surgery.* 2008; 3(6): 559-570.

Gupta V, Prakash K, Nowinski W. Towards discrimination of infarcts from artifacts in DWI scans. *International Journal of Computer Assisted Radiology and Surgery.* 2008 April; 2(6):385-395.

Hevia-Montiel N, Jimenez-Alaniz J, Medina-Banuelos V, Yanez-Suarez O, Rosso C, Samson Y, et al. Robust Nonparametric Segmentation of Infarct Lesion from Diffusion-Weighted MR Images *Engineering in Medicine and Biology Society,* 2007. EMBS 2007. 29th Annual International Conference of the IEEE. 2007. p. 2102-2105.

The invention claimed is:

1. A method of operation of an apparatus for identifying anomalous data in a test data set, wherein the test data set is a test image comprising a plurality of test pixels or voxels as test data points, the method comprising:
  receiving input, by the apparatus, of at least one standard image comprising a plurality of standard pixels or voxels;
  storing, by the apparatus, one or more standard data sets of a plurality of standard data cases, each standard data case containing one or more standard data points representing normal, non-anomalous, data, wherein each standard data case is a corresponding standard image, of the at least one standard image, comprising a corresponding plurality of standard pixels or voxels as standard data points;
  establishing a spatial correspondence between test data points of the test data set and respective corresponding standard data points in the one or more standard data sets of the plurality of standard data cases, wherein the establishing the spatial correspondence comprises spatially aligning the test image in co-registration with the at least one standard image;
  calculating a first average similarity distance measure between (a) and (b), where (a) includes one or more test data points in the test data set, and (b) includes one or more of the nearest neighboring corresponding standard data points in at least two of the plurality of standard data cases;
  determining a second average similarity distance measure between the nearest neighboring corresponding standard data points in at least two of the plurality of standard data cases;
  calculating a normalized similarity distance measure relating to the one or more test data points using a mathematical function, wherein at least the first and second average similarity distance measures are inputs to the mathematical function; and
  identifying a test data point as anomalous in dependence on a value of the calculated normalized similarity distance measure for the test data point.

2. A method according to claim 1, wherein a plurality of normalized similarity distance measures are calculated relating to the plurality of test pixels or voxels, the plurality of normalized similarity distance measures being stored as a normalized similarity distance measure map corresponding to the test image.

3. A method according to claim 2, wherein the at least one standard image and the test image include medical imagery received through at least one of the following: magnetic resonance imaging (MRI), computerized tomography (CT), ultrasound, or X-rays.

4. A method according to claim 3, wherein the test image is an MRI image of a brain potentially containing one or more pathological lesions, and the standard images are corresponding MRI images of normal brains without any focal lesions.

5. A method according to claim 1, wherein the identifying of a test data point as anomalous is a threshold based anomalous segmentation operation.

6. A method according to claim 5, wherein a threshold of the threshold based anomalous segmentation operation is an adaptive threshold determined in dependence on a predetermined rate of change of number of test data points identified as anomalous as the adaptive threshold is changed.

7. A method according to claim 5, further comprising performing a clustering operation to cluster segmented test data points, and removing clustered test data points comprising a number of data points less than a predetermined number from the anomalous segmentation operation.

8. A method according to claim 1, wherein there are n sets of x corresponding standard data cases, where n and x are greater than or equal to 2, and wherein the first average similarity distance measure is an average of x n-dimensional distance measures each from the test data point to n corresponding standard data points.

9. A method according to claim 8, wherein an n-dimensional distance measure is a Euclidean distance.

10. A method according to claim 8, wherein each standard data case contains first and second images, the second image being a processed version of the first image, the test data set comprising two test images, a test image having test pixels or voxels as test data points, wherein the first average similarity distance measure is an average of a series of two-dimensional distance measures taken between respective test pixels in each pair of test images and respective corresponding standard pixels in the standard first and second images.

11. A method according to claim 1, wherein mathematical function used to calculate the normalized similarity distance measure is the difference between the first and second average similarity distance measures.

12. A method according to claim 1, wherein the first average similarity distance measure is an average similarity distance from a test point to $k_1$ nearest neighbor corresponding standard data points, and the second average similarity distance measure is an average similarity distance measure between $k_2$ nearest neighbor corresponding standard data points, wherein $k_1$ and $k_2$ are different.

13. A method according to claim 1, wherein the or each standard data point and the or each test data point comprises n dimensions, wherein n is greater than 1, the n dimensions comprising one of: i) a plurality of aggregated data sub-points; ii) a plurality of spatial vector values; or iii) a plurality of representations of different types of a same feature to which a data point corresponds.

14. A method according to claim 13, wherein the plurality of representations of different types of a same feature are multi-spectral image data points obtained from respective multiple images of the same feature.

15. An apparatus, comprising:
  at least one processor; and
  at least one memory including computer program code, the at least one memory and the computer program code configured to, with the at least one processor, cause the apparatus to perform at least the following:
    receive input of one or more standard data sets of a plurality of standard data cases, each standard data case containing one or more standard data points representing normal, non-anomalous, data, wherein each standard data case is a standard image comprising a plurality of standard pixels or voxels as standard data points;
establish a spatial correspondence between test data points of a test data set and respective corresponding standard data points in the one or more standard data sets of the plurality of standard data cases, wherein the test data set is a test image comprising a plurality of test pixels or voxels as the test data points, and wherein the establishing the spatial correspondence comprises spatially aligning the test image in co-registration with the at least one standard image;
calculate a first average similarity distance measure between (a) and (b), wherein (a) includes one or more test data points in a test data set, and (b) includes one or more corresponding nearest neighbor standard data points in at least two of the plurality of standard data cases in the standard data sets;
determine a second average similarity distance measure between the nearest neighbor corresponding standard data points in the at least two of the plurality of standard data cases in the standard data set;
calculate a normalized similarity distance measure relating to the one or more test data points using a mathematical function, wherein at least the first and second average similarity distance measures are inputs to the mathematical function; and
identify a test data point as anomalous in dependence on a value of the calculated normalized similarity distance measure for the test data point.

16. An apparatus, comprising:
means for receiving input of one or more sets of a plurality of standard data cases, each standard data case containing one or more standard data points representing normal, non-anomalous, data, wherein each standard data case is a standard image comprising a plurality of standard pixels or voxels as standard data points;
means for establishing a spatial correspondence between test data points of a test data set and respective corresponding standard data points in the one or more standard data sets of the plurality of standard data cases, wherein the test data set is a test image comprising a plurality of test pixels or voxels as the test data points, and wherein the establishing the spatial correspondence comprises spatially aligning the test image in co-registration with the at least one standard image;
means for calculating a first average similarity distance measure between (a) and (b), wherein (a) includes one or more test data points in a test data set, and (b) includes one or more corresponding nearest neighbor standard data points in at least two of the plurality of standard data cases in the standard data set;
means for determining a second average similarity distance measure between the nearest neighbor corresponding standard data points in at least two of the plurality of standard data cases in the standard data set;
means for calculating a normalized similarity distance measure relating to the one or more test data points using a mathematical function, wherein at least the first and second average similarity distance measures are inputs to the mathematical function; and
means for identifying a test data point as anomalous in dependence on a value of the calculated normalized similarity distance measure for the test data point.

17. A non-transitory computer readable storage media storing computer readable instructions that, when executed by a computer, cause the computer to:
receive input of at least one standard image comprising a plurality of standard pixels or voxels;
store one or more standard data sets of a plurality of standard data cases, each standard data case containing one or more standard data points representing normal, non-anomalous, data, wherein each standard data case is a corresponding standard image, of the at least one standard image, comprising a corresponding plurality of standard pixels or voxels as standard data points;
establish a spatial correspondence between test data points of a test data set and respective corresponding standard data points in the one or more standard data sets of the plurality of standard data cases, wherein the test data set is a test image comprising a plurality of test pixels or voxels as the test data points, and wherein the establishing the spatial correspondence comprises spatially aligning the test image in co-registration with the at least one standard image;
calculate a first average similarity distance measure between (a) and (b), wherein (a) includes one or more test data points in a test data set and (b) includes one or more of the nearest neighboring corresponding standard data points in at least two of the plurality of standard data cases;
determine a second average similarity distance measure between the nearest neighboring corresponding standard data points in at least two of the plurality of standard data cases;
calculate a normalized similarity distance measure relating to the one or more test data points using a mathematical function, wherein at least the first and second average similarity distance measures are inputs to the mathematical function; and
identify a test data point as anomalous in dependence on a value of the calculated normalized similarity distance measure for the test data point.

* * * * *